United States Patent [19]
Sakamoto et al.

[11] Patent Number: 5,450,828
[45] Date of Patent: Sep. 19, 1995

[54] CONTROL DEVICE FOR FUEL INJECTION SYSTEM

[75] Inventors: Osamu Sakamoto; Chitoshi Saito, both of Hamamatsu, Japan

[73] Assignee: Sanshin Kogyo Kabushiki Kaisha, Hamamatsu, Japan

[21] Appl. No.: 84,508

[22] Filed: Jun. 29, 1993

[30] Foreign Application Priority Data

Jun. 30, 1992 [JP] Japan .................. 4-196025

[51] Int. Cl.$^6$ .............................................. F02D 43/00
[52] U.S. Cl. .................. 123/339.11; 123/352; 123/418
[58] Field of Search ............... 123/339, 350, 351, 352, 123/353, 361, 418

[56] References Cited

U.S. PATENT DOCUMENTS

| | | | |
|---|---|---|---|
| 4,470,391 | 9/1984 | Ishida | 123/308 |
| 4,550,703 | 11/1985 | Ootuka et al. | 123/478 |
| 5,095,873 | 3/1992 | Motoyama et al. | 123/339 X |
| 5,148,788 | 9/1992 | Saikalis et al. | 123/339 |

FOREIGN PATENT DOCUMENTS

64-41664 2/1989 Japan .

*Primary Examiner*—Tony M. Argenbright
*Attorney, Agent, or Firm*—Knobbe, Martens, Olson & Bear

[57] ABSTRACT

Embodiments of engine speed control and methods of maintaining engine speed control and fuel injection so as to minimize hunting and improve exhaust emission control, particularly at low speeds. This is achieved by setting a fixed amount of fuel supplied to the engine per cycle, per cylinder when the engine speed is below a predetermined speed or a speed below a predetermined speed is called for. Engine speed control is maintained under the constant fuel position by controlling the spark advance in one embodiment. A manual spark advance and automatic spark advance are depicted.

10 Claims, 8 Drawing Sheets

CONTROL DEVICE FOR FUEL INJECTION SYSTEM

BACKGROUND OF THE INVENTION

This invention relates to a control device for a fuel injection system and more particularly to an improved method and apparatus for controlling the fuel injection of an engine at low speeds.

As is well known, low speed running is one of the most difficult conditions to maintain good and stable engine performance and also maintain the low emission of hydrocarbons and other unwanted constituents in the exhaust system. These problems are particularly acute in conjunction with two cycle internal combustion engines because of the fact that the intake charge enters the chamber at the same time that the exhaust charge is being discharged. Under low speed conditions, there is a relatively high residual amount of exhaust gases in the engine and this can adversely affect low speed running. Therefore, it is a common practice with two cycle engines to provide a somewhat wider throttle opening at idle conditions than with four cycle engines.

The aforenoted problems are particularly magnified in conjunction with the use of the engine in a marine propulsion unit such as an outboard motor. Outboard motors frequently are called upon to operate at long periods of time at speeds that are actually less than idle. For example, during trolling it is the normal situation for the engine to operate at a speed even lower than idle speed. The aforenoted problems, as should be readily apparent, become particularly critical at this condition.

When the wider than throttle opening is utilized at idle in a two cycle engine, actual engine speed is controlled by controlling the spark timing rather than the throttle valve condition. However, the amount of fuel injected is controlled not only in response to throttle valve position but also in response to other factors such as engine load. This can give rise to a situation which is known as "hunting" or substantial over or under speed conditions when the load changes as may be understood best by reference to FIG. 1.

Figure 1:
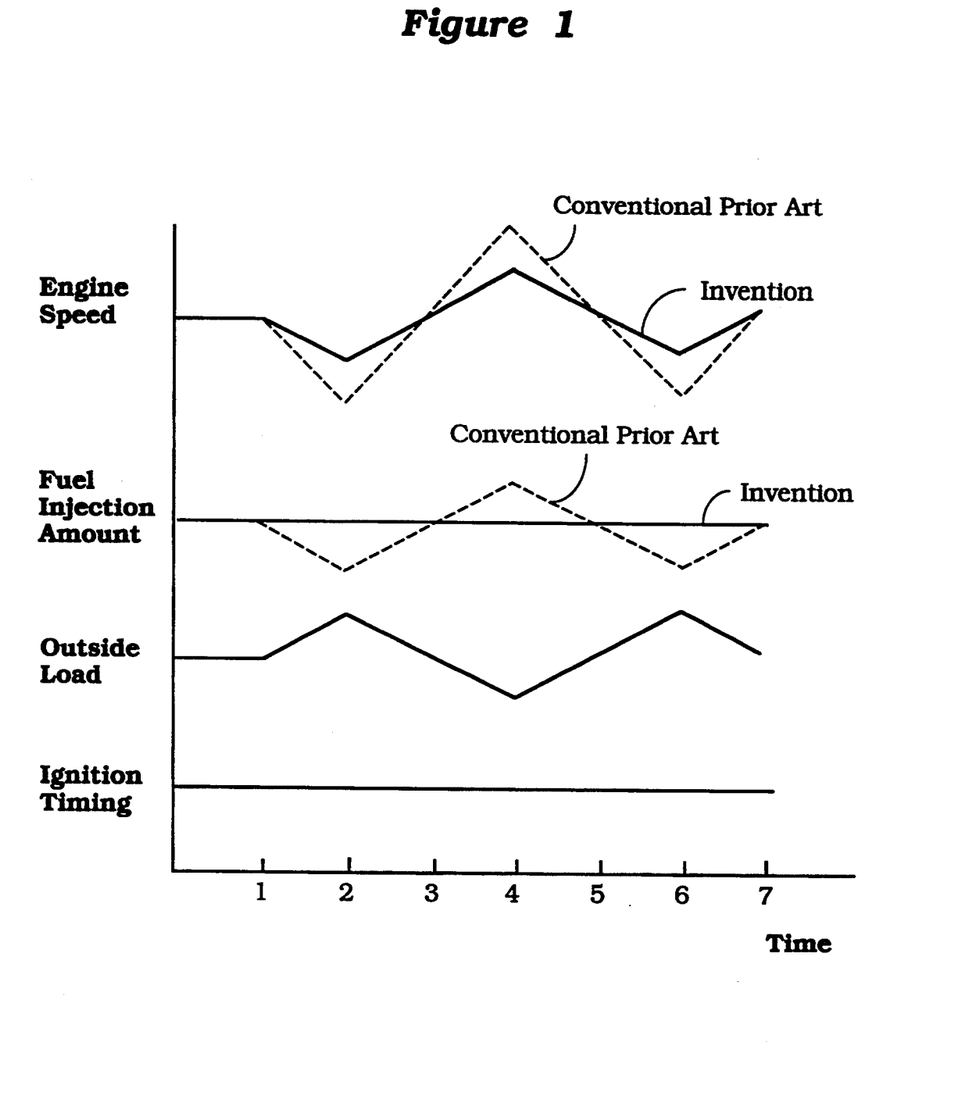
FIG. 1 is a graphically view showing engine speed, fuel injection amount, outside load and ignition timing in relation to running time and when operating at a low speed, low load, fixed throttle condition. The conventional system is shown in the broken line views and the inventive system is shown in the solid lines.

FIG. 1 is a graphically view showing engine speed, fuel injection amount, outside load and engine timing when operating at a trolling condition and as the running time progressively continues. As may be seen with a conventional engine, as shown by the broken line curves, when the outside load increase and the throttle position is maintained constant, the engine speed will fall off. However, as the engine speed is decreased than also the amount of fuel injected will be decreased since the engine speed is one of the control parameters. As a result, the decrease in engine speed will be magnified. In a same manner, as the load is decreasing, the engine speed will tend to increase and accordingly the amount of fuel injected will also increase, thus magnifying the over speed condition.

It is, therefore, a principal object to this invention to provide an improved method and apparatus for controlling the fuel injection system of an engine.

It is a still further objection to this invention to provide an improved method and apparatus for controlling the speed of an engine under load speed conditions.

It is a further object to this invention to provide an improved method and apparatus for engine speed control.

SUMMARY OF THE INVENTION,

This invention is adapted to be embodied in a method for operating an engine and an engine control system wherein the engine is provided with a fuel supply, a spark ignition system and an operator actuated speed control. Means are provided for controlling at least the fuel supply system for varying the amount of fuel supplied to the engine in response to the position of the speed control.

In accordance with a control system for the engine embodying the invention, means are provided for providing a fixed amount of fuel to the engine when the speed control is in a low speed position between its minimum speed position and its maximum speed position.

In accordance with a method for performing the invention, a fixed amount of fuel is supplied to the engine when the speed control is in a position contiguous to its minimum speed position and independent of the load or change in the speed of the engine.

DETAILED DESCRIPTION OF THE PREFERRED EMBODIMENTS OF THE INVENTION

Figure 2:
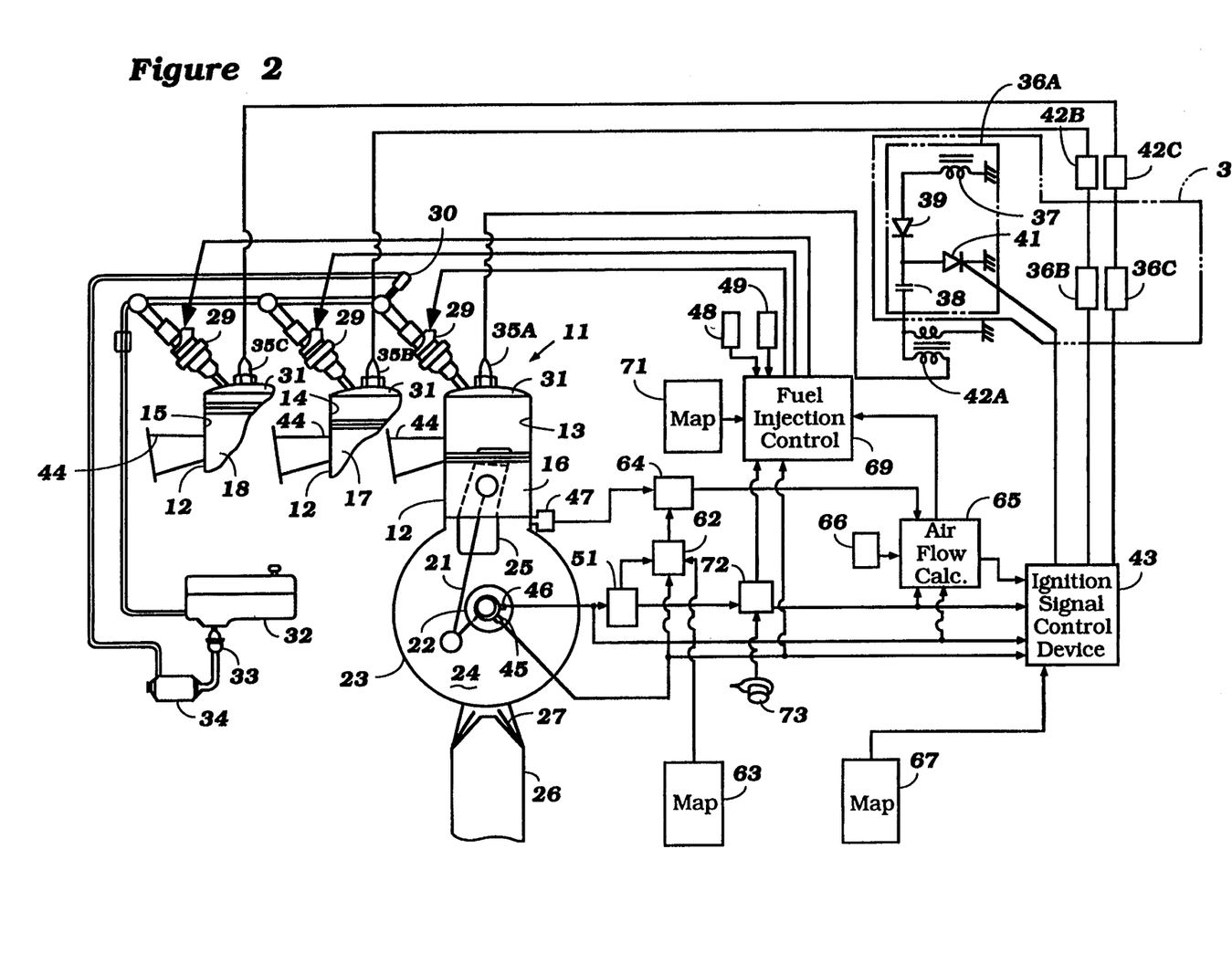
FIG. 2 is a partially schematic cross sectional view taken through a portion of an outboard motor constructed and operated in accordance with an embodiment of the invention.

Referring now in detail to the first embodiment and initially to FIG. 2, an internal combustion engine constructed and operated in accordance with this embodiment is identified generally by the reference numeral 11. The engine 11 is particularly adapted for use in powering an outboard motor because the engine 11 is, in the illustrated embodiment, of the two cycle, crankcase compression type. It is to be understood, however, that the invention may be employed in conjunction with other applications for two cycle engines and also that certain facets of the invention may be employed in conjunction with engines operating on other than the two stroke principal. The invention does, however, have particularly utility in conjunction with two cycle engines and outboard motor or marine applications since such engines have particularly problems with exhaust emission control, particularly at low speeds including speeds below idle. The engine 11 is, in the illustrated embodiment, of the three cylinder type but it is to be understood that the invention may be employed with engines have other numbers of cylinders or, in fact, for engines other than reciprocating engines.

The engine 11 includes a cylinder block 12, which is shown schematically in FIG. 2, and which has a plurality of cylinder bores 13, 14 and 15 aligned in one bank. These cylinder bores 13, 14 and 15 are formed by liners that are pressed into the cylinder block in a well known manner. Pistons 16, 17 and 18 are supported for reciprocation in each of the cylinder bores 13, 14 and 15. The pistons 16 are connected by means of connecting rods 21 to a crankshaft 22 which is journalled for rotation about a vertically extending axis within a crankcase 20 formed by the skirt of the cylinder block 12 and a crankcase member 23 that is affixed to the cylinder block 12 in a well known manner.

The crankcase member 23 and skirt of the cylinder block 12 form a plurality of respective crankcase chambers, one of which is indicated at 24 in FIG. 2 each of which communicates with a respective one of the cylinders bores 13, 14 and 15 through respective scavenge passages, only one of which appears in the drawings and is identified by the reference numeral 25, this being the scavenge passage associated with the cylinder bore 13. As is well known, the scavenge passages 25 communicate the crankcase chambers 24 with the cylinder bores 13, 14 and 15 as the pistons 16,17 and 18 reciprocate.

An air charge is delivered to the crankcase chambers 24 from an induction system that includes an induction manifold having individual runners 26 which serve the respective crankcase chambers 24. Reed type check valves 27 are disposed in each runner 26 for permitting the air charge to enter the respective crankcase chamber 24 but for precluding reverse flow when the charge is being compressed due to downward movement of the respective pistons 16, 17 and 18.

As has been noted, the induction system for the engine 11 introduces only a pure air charge into the individual crankcase chambers 24. It is to be understood that fuel injectors may be provided in the manifold runners 26 for supplying a fuel/air charge or in some instances, carburetors may be employed for supplying a fuel/air charge to the crankcase chambers 24. However, in the illustrated embodiments of the invention, the engine 11 is provided with direct cylinder fuel injection provided by individual fuel injectors 29. Each fuel injector 29 is electrically operated and has a solenoid for opening and closing an injection valve so as to permit fuel to be sprayed into a respective combustion chamber 31 formed by each of the cylinder bores 13, 14 and 15, pistons 16, 17 and 18 and a cylinder head (not shown) affixed to each cylinder bank.

Fuel is supplied to the fuel injectors 29 from a remotely positioned fuel tank 32 by a conduit system including an in-line filter 33 and high pressure pump 34. In addition, a fuel pressure regulator 30 is provided for controlling the pressure of fuel supplied to the individual fuel injectors by bypassing fuel back to the fuel tank 32.

The charge which has thus been formed in the combustion chambers 31 is fired by respective spark plugs, 35A through 35C each mounted in the respective cylinder head and having its gap projecting into the respective combustion chamber 31. The spark plugs 35 are fired by an ignition circuit, indicated generally at 36 in FIG. 2. The ignition circuit 36 includes a plurality of individual firing circuits 36A through 36C with one of the circuits, that associated with the cylinder bore 13, being shown in detail.

These firing circuits are of the SCR type and include a charging coil 37 of a flywheel magneto of the engine 11 which charges a charging capacitor 38 through a diode 39. An SCR 41 is provided for selectively discharging the capacitor 38 to the ground and inducing a high voltage in a respective spark coil 42A through 42C associated with each of the spark plugs 35A through 35C for firing the spark plugs in a manner well known in this art. The SCR's 41 of the individual ignition control circuits 36A through 36C are switched by an ignition signal control device, indicated generally by the reference numeral 43 and operating in a manner which will be described.

When the charge in the individual combustion chambers 31 is fired, it will burn and expand and drive the respective piston 16, 17 or 18 downwardly so as to drive the crankshaft 22 in a well known manner. The burnt charge is discharged through a respective exhaust port 44 formed in the cylinders 13, 14 and 15. The exhaust ports 44 communicate with a conventional exhaust system (not shown).

The control system for the fuel injectors 29 and spark plugs 35 includes a number of sensors which sense ambient conditions and engine running conditions. Although certain specific types of sensors will be described, it is to be understood that additional inputs of ambient and engine running conditions may be employed or other inputs may be substituted for those which are described. Such variations in the control parameters will be readily apparent to those skilled in the art.

The sensors include a basic crank angle detecting sensor 45, and pulser coil 46 that are mounted on the crankcase 23 in proximity to the crankshaft 22 and which indicate both the angular position of the crankshaft and its rotational speed. In addition, a crankcase pressure sensor 47 is provided in one or more of the crankcase chambers 24 for sensing the pressure in the crankcase chambers. It is well known that differences in crankcase pressure during a cycle are a very accurate indication of air flow to the engine.

Engine temperature is sensed by an engine temperature sensor 48 that is mounted in a suitable manner, preferably on the cylinder block 12 in proximity to the cooling jacket of the engine so as to provide an indication of actual engine temperature. Also, there is provided a shift position detector 49 which will sense the condition of the transmission (not shown) of the associated outboard motor. The shift condition sensor 61 provides an output signal indicative of when the transmission is in a neutral condition.

It has already been noted that the firing of the spark plugs is controlled by the spark control circuit 36 which is, in turn, controlled by the ignition signal control device 43. The ignition signal control device 43 receives signals which are indicative both of engine speed crankshaft rotational angle and air flow. The pulser coil 46 outputs its signal to an engine speed detector circuit 51 which counts the pulses in a given time period and provides a signal of engine speed to the ignition control device 43. In a same manner, the crank angle position detector 45 outputs a signal indicative of crank angle to the ignition signal control device 43.

The engine speed detector 51 also outputs a signal to a convertor 62 which receives also the crank angle signal from the sensor 45 and which determines from a map or memory 63 the relationship between engine speed and crank angle so as to control the outputs of the pressure sensor 58 through a control 64 so as to feed the crankcase pressure signals at the appropriate times to an air flow calculator 65 which also has a map or memory 66 so as to provide an output signal to the ignition signal control device 43 indicative of the amount of air flowing to the engine. The ignition control device 43 then processes these signals and compares them with a map contained in a memory 67 so as to calculate the appropriate engine timing for firing of the spark plugs 35 and thus controlling the SCR's 41 in the aforedescribed manner so as to fire the spark plugs 35 at the appropriate crank angle.

The duration and timing of the fuel injectors 29 is controlled by a fuel injection control, indicated schematically at 69 which receives signals from both the crankshaft position detector 45 and engine speed from the engine speed detector 51 as well as the air flow signal from the air flow calculator 65. In addition, the fuel injection control 69 also receives the engine temperature signal from the engine temperature sensor 48 and a signal from the shift position detector 49. Furthermore, an additional map or memory 71 is provided which permits the fuel injection control 69 to select the appropriate timing and duration of fuel injection. In addition to the aforenoted components, there is also provided an input control device 72 that is operated by a manual operator speed control 73 and which varies the output signals that are delivered to the fuel injection control 69 and ignition signal control 43 dependent upon the operator demand for the speed of the engine and to control engine speed.

Under normal operation, the system operates so as to provide the appropriate spark timing for firing of the spark plugs 35A, 35B and 35C and also the timing and duration of fuel injection by the fuel injectors 29. Since any conventional strategy may be employed for this purpose, further description of that conventional structure is not believed to be necessary although certain components of the conventional control will be described in conjunction with the control routine which practices the invention so as to reduce the hunting of the speed at low speed conditions and at low speed settings of the throttle control 73 and throttle valve 28. This control routine will now be described by particular reference to FIG. 3 and at times, by reference to FIG. 4.

Figure 3:
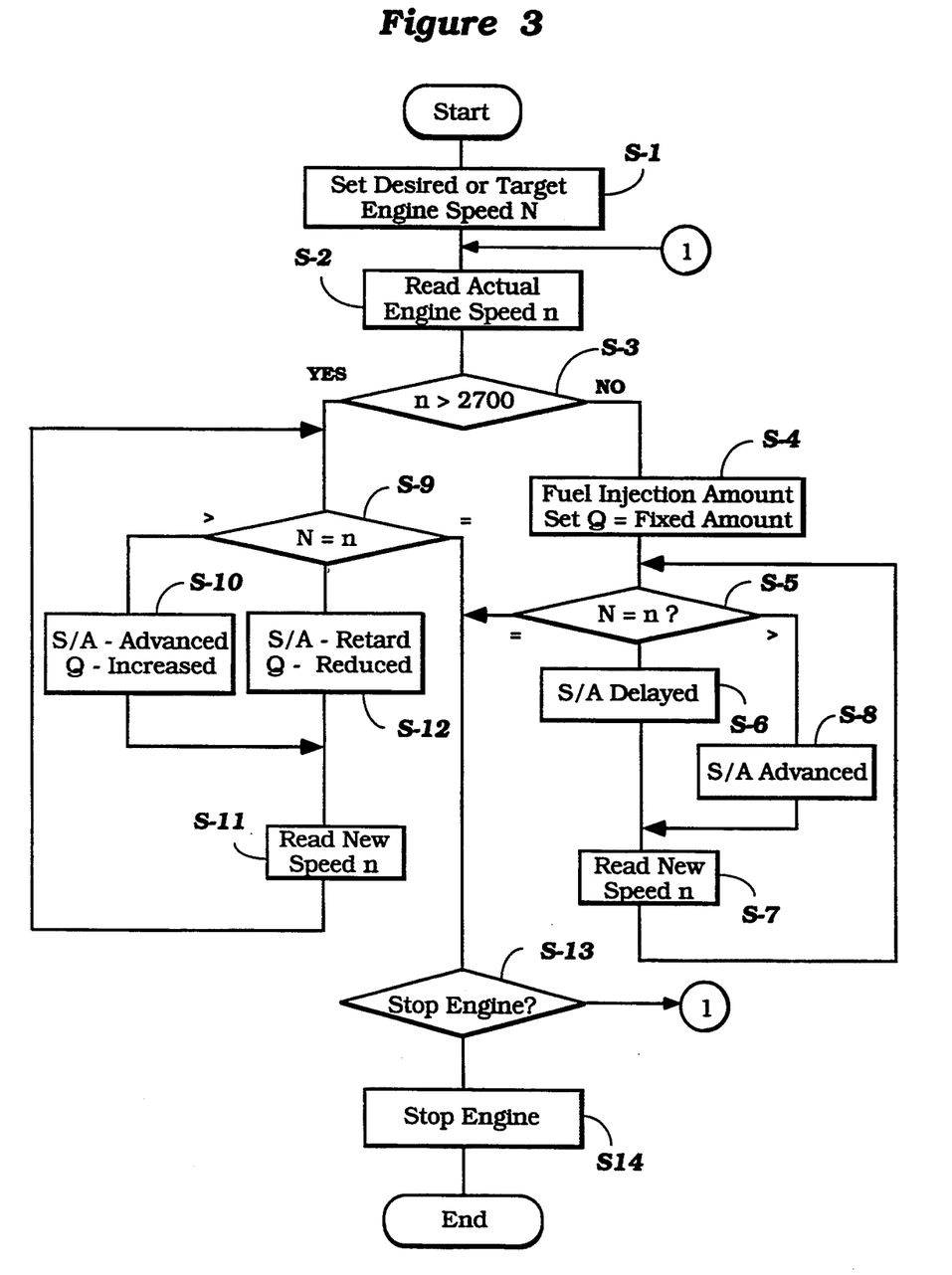
FIG. 3 is a graphically view showing the control routine in accordance with an embodiment of the invention and utilizing the system shown in FIG. 2.

Referring specifically now to FIG. 3, the program starts and then moves to the step S1 wherein the desired or target engine speed "N" is set by the operator operating the speed control knob 73. The program then moves to the step S2 to read the then actual engine speed "n". The program then moves to the step S3 to determine if actual engine speed "n" is greater than the speed under which fixed control is begun and in the illustrated embodiment, this speed is 2700 rpm. This speed is shown by the reference line "I" in FIG. 4. If the engine speed is not greater than 2700 rpm, then the program moves to the control routine in accordance with the invention by moving to the step S4. As will be noted hereinafter, if the engine speed is at above this set engine speed of 2700 rpm, a conventional speed control routine will be followed.

Figure 4:
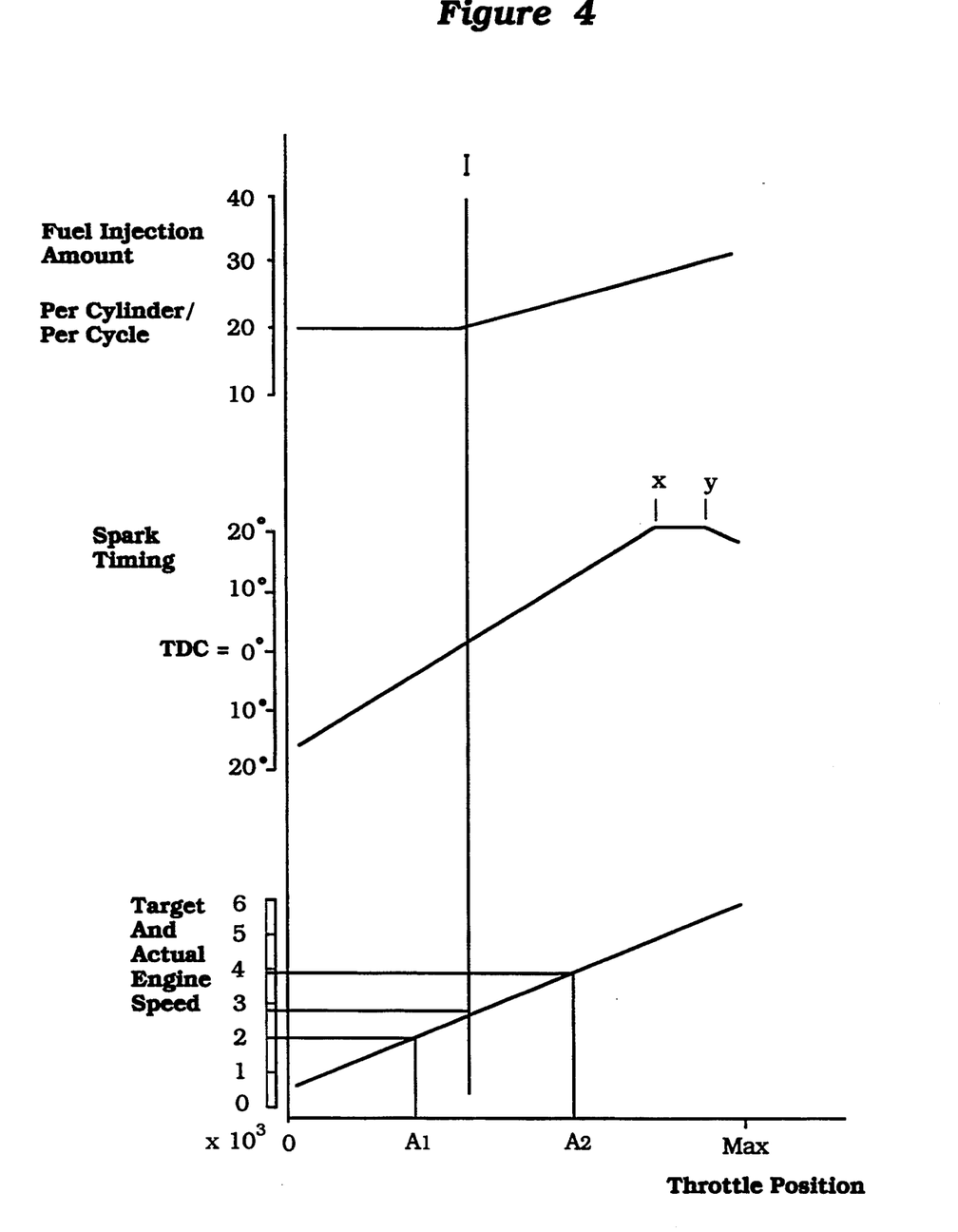
FIG. 4 is a graphically view showing the fuel injection volume per cycle, sparking timing and engine speed in relation to throttle position.

At the step S4 the fuel injection amount "Q" per cycle per cylinder of the engine 11 is set a fixed amount as shown on the top curve of FIG. 4. Hence, this fixed amount of fuel is supplied at all engine speeds which do not exceed 2700 rpm unlike earlier constructions wherein the fuel injection amount is varied in response to varying speed and even if all other conditions are the same.

The program then moves to the step S5 to determine if the actual engine speed "n" is less than, equal to or greater than the called for engine speed "N". If the required engine speed "N" is less than the actual engine speed "n", then the program moves to the step S6 so as to reduce the engine speed. Engine speed is controlled by advancing or retarding of the spark timing as shown by the spark timing curve on FIG. 4. Hence, in order to reduce the actual engine speed "n" to the desired engine speed "N", the spark is retarded. The program then moves to the step S7 to again read the new engine speed "n" and the program repeats back to the step S5.

If at the step S5 it has been determined that the target engine speed "N" is greater than the actual engine speed "n", than the program moves to the step S8 so as to increase the engine speed by advancing the spark timing as again may be seen by reference to FIG. 4. The program then moves to the step S7 so as to read the new engine speed "n" and then repeats back to the step S5.

Referring again now back to the step S3, if it is determined that the actual engine speed "n" is greater than the control or set engine speed of 2700 rpm, then the program moves to a normal engine speed control routine beginning at the step S9. At the step S9 the desired or target engine speed "N" is compared with the actual engine speed "n". In this control routine, the engine speed is controlled by changing both the spark timing and the duration of fuel injection or fuel injection amount "Q". Hence, if the target engine speed "N" is greater than the actual engine speed "n", then the program moves to the step S10 so as increase the engine speed by advancing the spark and increasing the amount of fuel injected "Q" per cycle, per cylinder as shown on the graph of FIG. 4. It will be noted on FIG. 4 that at certain higher engine speeds, the spark timing is not advanced and may in fact be retarded. Hence, the spark timing shown at the step S10 is actually the timing of the spark shown on the spark timing graph of FIG. 4.

After the spark is controlled and the fuel injection amount is increased, the program then moves to the step S11 so as to read the new engine speed "n". The program then repeats back to the step S9.

If, however, at the step S9 it has been determined that the desired engine speed "N" is less than the actual engine speed "n", then the program moves to the step S12 so as to reduce the engine speed by retarding the spark, bearing again in mind the portion of the spark advance curve at high throttle, high speed settings and also to reduce the amount of fuel injected per cycle, per cylinder "Q". The program then moves to the step S11 to read the new engine speed and then repeats back to the step S9.

If at the step S9 it is determined that the desired engine speed "N" is equal to the actual engine speed "n" or if at the step S5 this equal relationship has been determined, then the program will move the step S13. At the step S13, it will be determined if a stop engine signal has been generated subsequent to the setting of the speed.

The engine may be stopped by opening the ignition switch or by closing a kill switch. If the engine has not been called for to be stopped, the program repeats back to step S2 to again read engine speed "n" and the program will again repeat in accordance with the described control routine so long as the engine speed control 73 has not been repositioned.

If at the step S13 it has been determined that the stop engine signal has been generated, then the program moves to the step S14 so as to stop the engine and the program then ends.

From the foregoing description, it should be readily apparent that the embodiment of the invention as thus far described is very effective in maintaining good engine speed control at low throttle settings and at low engine speeds as may be seen by a comparison of the solid line curve of engine speed to time in FIG. 1 as opposed to the conventional prior art type of construction. Although the engine speed will decrease as the load increases and increase as the outside load decreases, the engine speed will be maintained more uniform with less hunting than with the conventional prior art type of constructions where the amount of fuel supplied to the engine is varied.

Another embodiment of the invention will now be described by particular reference to FIGS. 5 and 6. In this embodiment, further details of the spark advance and a throttle control system are illustrated and in this embodiment a mechanical spark advance mechanism is depicted and the embodiment shows the relationship of the throttle position to spark advance position. In addition, this embodiment employs, as will be described, a different method for determining the air flow to the engine.

Figure 5:
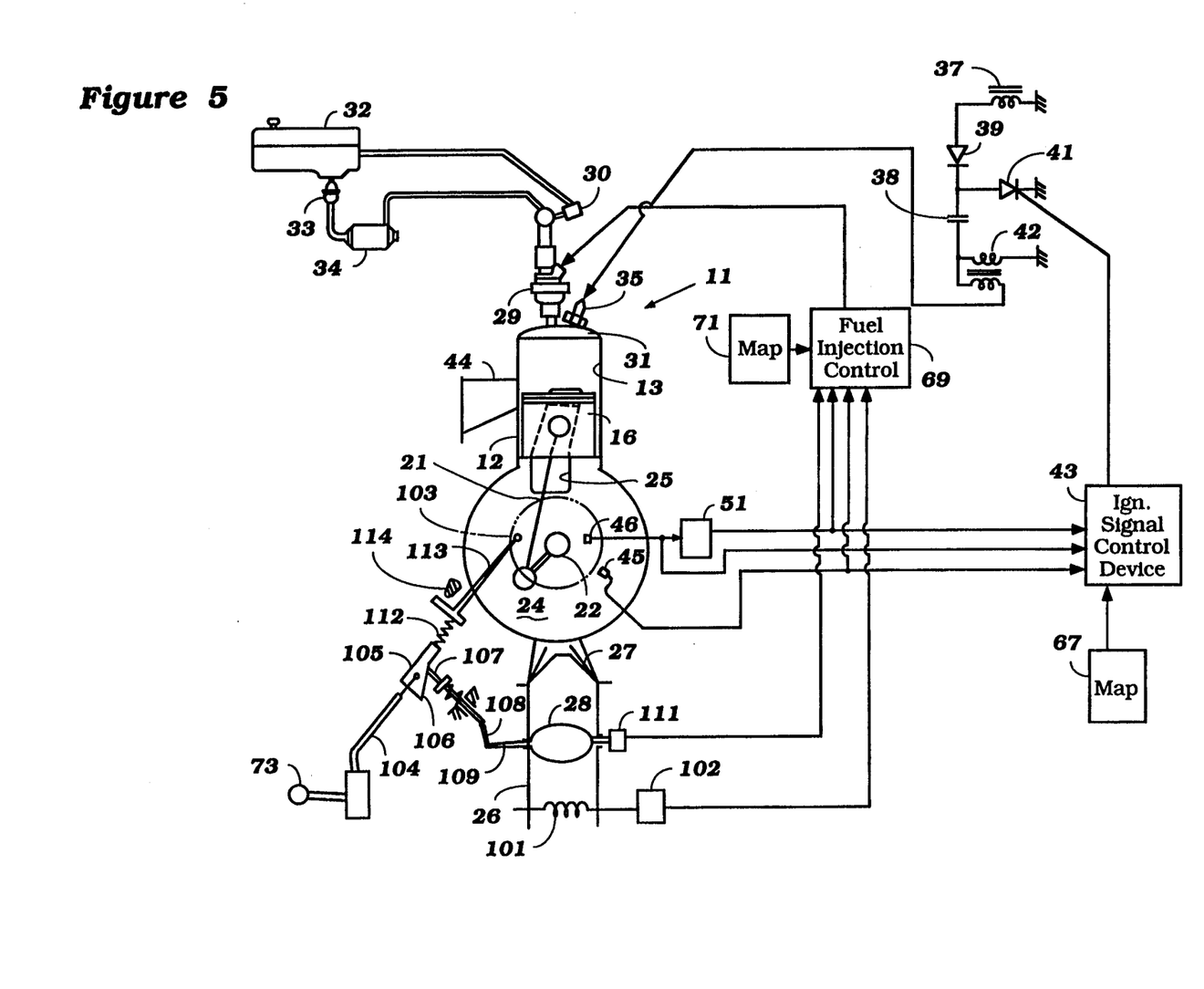
FIG. 5 is a schematic view, in part similar to FIG. 1, and shows another embodiment of the invention.
Figure 6:
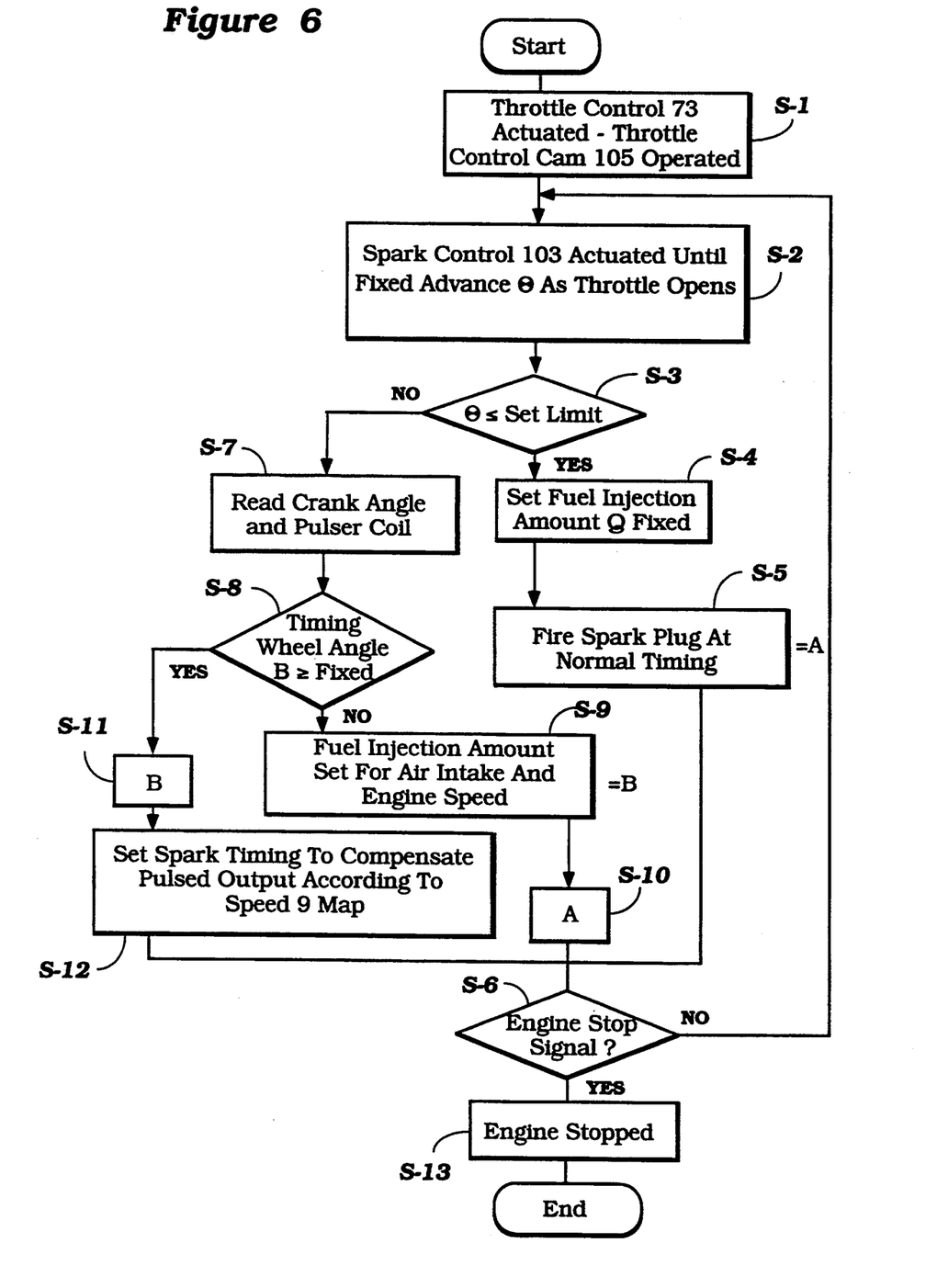
FIG. 6 is a block diagram showing the control routine for this embodiment.

In FIG. 5 the basic engine construction of the cylinder, piston, crankshaft, fuel injection system and spark ignition system is the same as that previously described and only the control variables therefore are changed. Hence, components of this embodiment which are the same as the previously described embodiments have been identified by the same reference numerals and will be described again only insofar as is necessary to understand the construction and operation of this embodiment. In this embodiment also there has been depicted only a single cylinder of the engine and it will be readily apparent to those skilled in the art how the invention can be practiced with multiple cylinder engines.

As has been noted, in this embodiment the air flow to the engine and hence the load is measured not be sensing crankcase pressure but rather by means of an air flow meter 101 of the hot-wire type that is positioned in the induction passage 26 and which will, as noted, provide a signal indicative of air flow to a circuit 102 that converts the resistance of the wire 101 into an air flow signal which is transferred to the fuel injection control 69.

This figure also shows a connection of the speed control 73 to a throttle valve 28 and also to a timing plate 103 that carries the pulser coil 46 for rotation relative to the crankshaft 22 so as to change spark timing. As may be seen, the speed control 73 operates a bowden wire 104 that moves a throttle control cam 105 having a cam surface 106 that is engaged by a throttle actuating lever 107. The throttle actuating lever 107 is connected to a bellcrank 108 on a throttle valve shaft 109 for rotating the throttle valve 28 to a position called for by the operator.

A throttle position sensor 111 of any known type is coupled to the throttle valve shaft 109 and outputs a signal of throttle valve position to the fuel injection control 69.

A spring 112 couples the throttle control cam 105 to a timing rod 113 which is coupled to the timing plate 103 so as to rotate it in response to rotation of the throttle so as to provide a manual spark advance. The connection is such, however, that the spark control rod 113 will eventually engage a stop 114 so as to determine a fixed maximum advance for the spark timing when the throttle is moved to a position less than its fully opened position. This is at the point "X" on the spark timing curive of FIG. 4. Continued movement of the throttle control lever 73 will thereafter cause movement of the throttle control cam 105 but the spark control rod 113 will not move further so as to provide the fixed advance as shown in FIG. 4. With such an arrangement as shown in this Figure the retardation after the point "Y" as full throttle is approached, can be achieved within the ignition signal control device 43.

The control routine for this embodiment is illustrated and will be described by particular reference to FIG. 6. As seen in this figure, at the step S1 the throttle control 73 is actuated the movement of the throttle control cam 105 follows the movement of the throttle control lever 73.

At the step S2 the spark control 103 is also actuated, along with the movement of the throttle control cam 105 until the fixed maximum spark advance is reached at the point "X" and then this is held, as aforedescribed.

Figure 8:
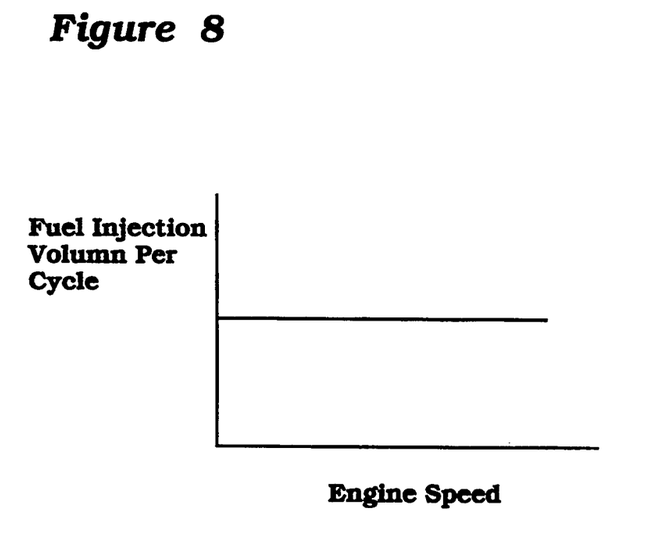
FIG. 8 is a graphically, view showing the fuel injection volume per cycle in relation to engine speed during one phase of the control routine of either embodiment.

The program then begins actually at the step S3 wherein it is determined what the actual position $\theta$ of the throttle valve 28 is being set so as to determine if this figure is greater than or less than a fixed value which is indicative of the engine speed under which the control routine of this invention should be practiced. With the aforenoted example, this will be a throttle opening which approximates the 2700 rpm speed. If at the step S3 it is determined that the opening of the throttle valve 28 is at the fixed low amount where the desired maintenance of fixed fuel injection amount is desirable, then the program moves to the step S4 so as to set the amount of fuel injection per cycle "Q" at a fixed limit as shown in FIG. 8 so that the fuel injection amount will be constant regardless of engine speed or throttle control position if less than the set value. The program then moves to the step S5 so as set the spark plug timing at the normal timing as determined by the position of the timing plate 103 in accordance with the manual timing control routine "A". The program then moves to the step S6 to determine if the engine stop signal has been generated so as to determine that the engine should be stopped. If it has not, the program moves back to the step S1 and repeats.

Assuming that at the step S3 it has been determined that the throttle angle $\theta$ of the throttle valve 28 is set greater than the set limit so that normal engine control can be accomplished, the program moves to the step S7 to read both the crank angle and the pulser coil outputs from the sensors 45 and 46, respectively. The program then moves to the step S8 so as to determine if the spark advance plate 103 has approached its fixed advance figure "X". If it has not, then the program moves to the step S9 so as read the fuel injection amount as determined by the actual engine speed as determined by the output from the speed calculator 51 and the air intake amount from the sensor 101 and its output circuit 102.

Figure 9:
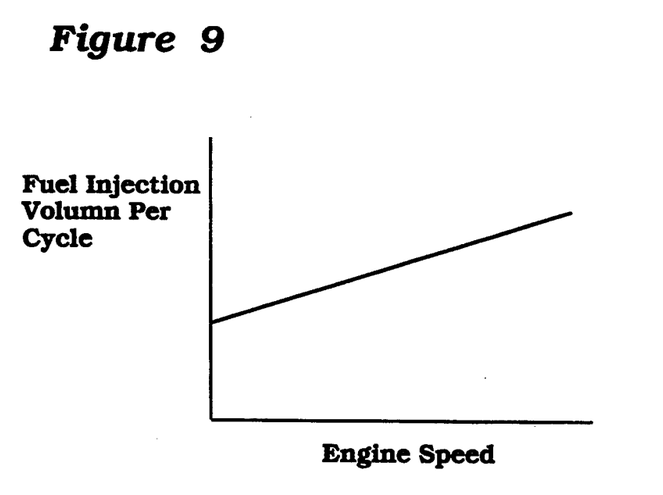
FIG. 9 is a graphically view showing the fuel injection volume per cycle during another phase of the control routines.

This fuel injection amount "Q" is determined from the graph of FIG. 9. The program then moves to the step S10 so as to follow the timing routine "A" for firing of the spark plugs 35 at the timing set by the position of the timing plate 103. The program then moves to the step S6 to determine if the engine stop signal has been initiated and if not, the program repeats back at the step S2 so long as the position of the throttle control 73 has not been reset.

If at the step S8 it is determined that the ignition timing wheel 103 has been rotated so that it is at the maximum fixed spark advance $\theta$ (point "X" of FIG. 4), then the program moves to the step S11 so as to set the fuel injection amount in accordance with the control routine "B" of step S19 as determined by the air intake amount and engine speed. The program then moves to the step S12 so as to set the spark timing so that the timing of firing of the spark plugs 35 is determined by compensating the output of the pulser coil 46 so as to relate to the actual engine speed and the map from the map 67 of the ignition control device 43 to follow the ignition timing curve as shown in FIG. 4 from the point "X" to full throttle position.

The program then moves to the step S6 to determine if the engine stop signal has been generated and if it has not, the program repeats as aforenoted.

If, however, it is determined at the step S6 that the engine stop signal has been generated, then the program moves to the step S13 so as to stop the engine in any well known manner and the program then ends.

Figure 7:
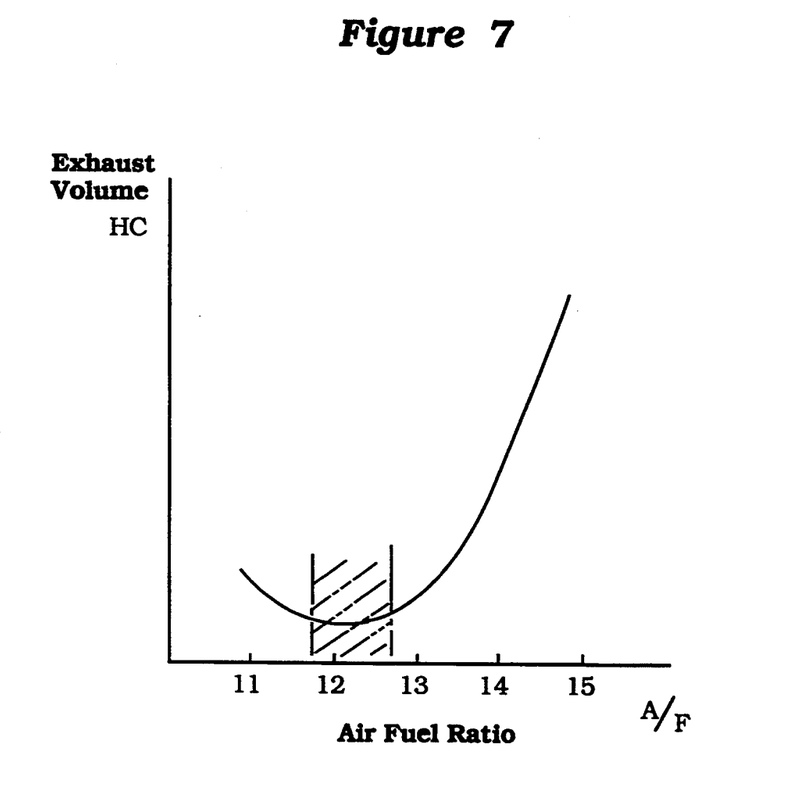
FIG. 7 is a graphically view showing the amount of hydrocarbons in the exhaust in relation to various air/fuel ratios.

By virtue of operating in accordance with the embodiments of the invention as thus far described, not only is engine speed stabilized but the amount of hydrocarbons in the exhaust gases are reduced because smooth burning is accomplished and the air/fuel ratio is maintained as shown in FIG. 7 wherein the air/fuel ratio is maintained in the shaded area during these low speed running conditions.

It should be understood that the foregoing description is that of preferred embodiments of the invention and that various changes and modifications may be made without departing from the spirit and scope of the invention, as defined by the appended claims.

We claim:

1. An engine speed control system for an internal combustion engine having a fuel supply system including a fuel injector, a spark ignition system, an operator actuated speed control movable between a minimum speed position and a maximum speed position, and control means for varying at least said fuel supply system for varying the amount of fuel supplied to said engine by said fuel injector in response to the position of said operator actuated speed control when said operator actuated speed control is in positions other than contiguous to said minimum speed position, and means for providing a fixed amount of fuel to said engine from said fuel injector when said engine speed control is in a position contiguous to said minimum speed position regardless of the speed of the engine or the load on the engine and controlling the speed by a system other than the fuel supply system.

2. An engine speed control system as set forth in claim 1 wherein the fixed amount of fuel is provided when the engine speed is equal to or below a predetermined engine speed.

3. An engine speed control system as set forth in claim 2 wherein the system for controlling the engine speed when operating in a range where the fixed amount of fuel is supplied comprises the ignition system and the speed is controlled by varying the spark advance.

4. An engine speed control system for an internal combustion engine having a fuel supply system, a spark ignition system, an operator actuated speed control, and control means for varying at least said fuel supply system for varying the amount of fuel supplied to said engine in response to the position of said operator actuated speed control, means for providing a fixed amount of fuel to said engine when said engine speed control is in a position contiguous to a minimum speed position regardless of the speed of the engine or the load on the engine, and maintaining the engine speed when operating in a range where the fixed amount of fuel is supplied by varying the spark advance.

5. An engine speed control system as set forth in claim 4 wherein the fuel supply system comprises a fuel injection system.

6. A method of engine speed control for an internal combustion engine having a fuel supply system including a fuel injector, a spark ignition system, an operator actuated speed control movable between a minimum speed position and a maximum speed position, said method comprising the steps of controlling the speed of said engine in response to the position of said operator actuated speed control when said operator actuated speed control is in positions other than contiguous to said minimum speed position by varying at least said fuel supply system for varying the amount of fuel supplied to said engine by said fuel injector in response to the position of said operator actuated speed control and providing a fixed amount of fuel to said engine from said fuel injector when said engine speed control is in a position contiguous to said minimum speed position regardless of the speed of the engine or the load on the engine by controlling a system other than said fuel supply system.

7. An engine speed control method as set forth in claim 6 wherein the fixed amount of fuel is provided when the engine speed is equal to or below a predetermined engine speed.

8. An engine speed control method as set forth in claim 7 wherein the other system controlled for maintaining the engine speed when operating in a range where the fixed amount of fuel is supplied is the spark ignition system and the speed is maintained by varying the spark advance.

9. An engine speed control method for an internal combustion engine having a fuel supply system, a spark ignition system, an operator actuated speed control, and control means for varying at least said fuel supply system for varying the amount of fuel supplied to said engine in response to the position of said operator actuated speed control, means for providing a fixed amount of fuel to said engine when said engine speed control is in a position contiguous to a minimum speed position regardless of the speed of the engine or the load on the engine, and maintaining the engine speed when operating in a range where the fixed amount of fuel is supplied by varying the spark advance.

10. An engine speed control method as set forth in claim 9 wherein the fuel supply system comprises a fuel injection system.

* * * * *